(12) United States Patent
Yuan et al.

(10) Patent No.: US 11,582,227 B2
(45) Date of Patent: Feb. 14, 2023

(54) SECURING NETWORK ACCESS AT EDGE SITES USING TRUSTED NETWORK DEVICES

(71) Applicant: MICROSOFT TECHNOLOGY LICENSING, LLC, Redmond, WA (US)

(72) Inventors: Lihua Yuan, Redmond, WA (US); Pradeepkumar Mani, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/131,703

(22) Filed: Dec. 22, 2020

(65) Prior Publication Data

US 2022/0200986 A1 Jun. 23, 2022

(51) Int. Cl.
| | |
|---|---|
| *H04L 9/40* | (2022.01) |
| *G06F 21/44* | (2013.01) |
| *H04L 9/32* | (2006.01) |
| *H04L 9/08* | (2006.01) |
| *G06F 21/57* | (2013.01) |

(52) U.S. Cl.
CPC ...... *H04L 63/0853* (2013.01); *H04L 63/0236* (2013.01); *H04L 63/0823* (2013.01); *H04L 63/101* (2013.01); *H04L 63/126* (2013.01)

(58) Field of Classification Search
CPC ............. H04L 63/0853; H04L 63/0236; H04L 63/0823; H04L 63/101; H04L 63/126; H04L 2209/127; H04L 9/3234; H04L 9/0897; G06F 21/44; G06F 21/57
See application file for complete search history.

(56) References Cited

U.S. PATENT DOCUMENTS

| | | |
|---|---|---|
| 7,370,362 B2 | 5/2008 | Olson et al. |
| 9,288,081 B2 | 3/2016 | Casado et al. |
| 9,531,644 B2 | 12/2016 | Shukla et al. |

(Continued)

OTHER PUBLICATIONS

Sean Choi, Boris Burkov, Alex Eckert, Tian Fang, Saman Kazemkhani, Rob Sherwood, Ying Zhang, and Hongyi Zeng, FBOSS: Building Switch Software at Scale, 2018, SIGCOMM 2018 (Year: 2018).*

(Continued)

*Primary Examiner* — Amie C. Lin
(74) *Attorney, Agent, or Firm* — Newport IP, LLC; Han K. Gim

(57) ABSTRACT

Techniques are described for securely managing computing resources in a computing environment comprising a computing service provider and a remote computing network. The remote computing network includes computing and network devices configured to extend computing resources of the computing service provider to remote users of the computing service provider. The network devices include a trusted network device that includes a root of trust. The trusted network device detects that a new device is communicatively coupled to a port on the trusted network device. The trusted network device determines that the new device is not authorized to access computing resources at the remote computing network. The port is isolated at the trusted network device.

20 Claims, 8 Drawing Sheets

(56) References Cited

U.S. PATENT DOCUMENTS

| | | |
|---|---|---|
| 9,652,253 B2 | 5/2017 | Narayanan et al. |
| 9,699,001 B2 | 7/2017 | Addanki et al. |
| 9,742,697 B2 | 8/2017 | Tripathi et al. |
| 9,923,815 B2 | 3/2018 | Assarpour et al. |
| 10,200,343 B2 | 2/2019 | Chanda et al. |
| 10,587,586 B2 | 3/2020 | Kumar et al. |
| 2012/0265976 A1 | 10/2012 | Spiers et al. |
| 2019/0007216 A1 | 1/2019 | Meriac |
| 2019/0311127 A1* | 10/2019 | Raghuram ............... G06F 21/53 |
| 2020/0112515 A1* | 4/2020 | Brar ........................ H04L 63/10 |
| 2020/0274719 A1 | 8/2020 | Pak et al. |
| 2021/0058388 A1* | 2/2021 | Knotwell .............. G06F 9/5077 |

OTHER PUBLICATIONS

Uppal, Hardeep, "Enabling Trusted Distributed Control with Remote", In Undergraduate Thesis, Jun. 2010, pp. 1-20.

"International Search Report and Written Opinion Issued in PCT Application No. PCT/US21/057488", dated Feb. 10, 2022, 10 Pages.

Suriano, et al., "Attestation of Trusted and Reliable Service Function Chains in the ETSI-NFV Framework", In Proceedings of 6th IEEE Conference on Network Softwarization, Jun. 29, 2020, pp. 479-486.

* cited by examiner

SECURING NETWORK ACCESS AT EDGE SITES USING TRUSTED NETWORK DEVICES

BACKGROUND

A data center may house computer systems and various networking, storage, and other related components. Data centers may, for example, be used by service providers to provide computing services to businesses and individuals as a remote computing service or provide "software as a service" (e.g., cloud computing). Service providers may also utilize edge sites that may include a geographically distributed group of servers and other devices that work together to provide efficient delivery of content to end-users of data center services, with the goal being to provide services with high availability and improved latencies.

Such networks must also provide security for their users. For example, the networks must guard against continuous threats from malicious parties seeking unauthorized access to the networks. Implementing countermeasures, however, is often reactive, where network administrators must wait to identify the newest exploit before deploying a countermeasure. Correctly anticipating, identifying, and blocking new threats is crucial to maintaining security of a network.

It is with respect to these considerations and others that the disclosure made herein is presented.

SUMMARY

In various embodiments, users of a computing service such as a cloud computing service may be provided use of such services via computing and storage resources of the computing service at a remote location ("edge site"). The users may continue to benefit from the computing services, while aspects of the services are incorporated into the edge sites. Edge sites enable a data center to extend cloud services to local deployments using a distributed architecture that enables federated options for local and remote data and control management.

It is desirable to provide the highest level of computing availability at an edge site while at the same time providing performance, minimizing cost, and maintaining high levels of security. While data centers typically have a number of security features to prevent unauthorized access to their networks, edge sites are typically much smaller in scale and have varying levels of security. Thus, an unauthorized person with physical access to an edge rack may be able to access the networking hardware at the edge site. While access control to configure the switches is limited to authorized personnel, it may still be possible for an unauthorized person to plug in an untrusted device to an unused port, or unplug a trusted device from a switch port and plug in an untrusted device in its place. This may allow the untrusted device to have access to critical networking infrastructure of the data center's network. The unauthorized device may not have the necessary credentials to join the network and communicate to other infrastructure services, but the unauthorized device may expose the network to other types of vulnerabilities such as sniffing and passive monitoring.

The present disclosure provides a way for a cloud service provider that manages remotely located edge sites to enforce network access control by only enabling network ports at the remote edge sites that have authorized devices connected to them. Network devices such as Top of Rack (Tor) switches at the edge sites typically execute network operating systems. In an embodiment, the network devices may be configured to establish a root of trust and execute containers that enforce access control at each port. A root of trust may be created via the network operating system through the use of platform integrity techniques such as TPM-based secure boot. Once the root of trust is established, the trusted network device may establish a distributed chain of trust between the remote edge site and the service provider data center.

A chain of trust may be established to authenticate additional devices at the remote edge site, such as servers at the remote edge site that may be issued certificates that chain back to the trusted root. The trusted network devices may disable (and by extension network access) ports that are connected to unauthorized devices. This enables a more granular level of security control as compared to relying upon a centralized authentication scheme at the main data center, since the trusted network device can shut off a suspect port. The disclosed techniques provide a more scalable way to maintain authentication schemes as the number of edge sites grow, by extending the root of trust to the network devices who can validate compute nodes on their ports via the chain of trust.

The described techniques can allow for a data center to provide localized and distributed nodes for providing user computing resources while maintaining secure use of computing capacity such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
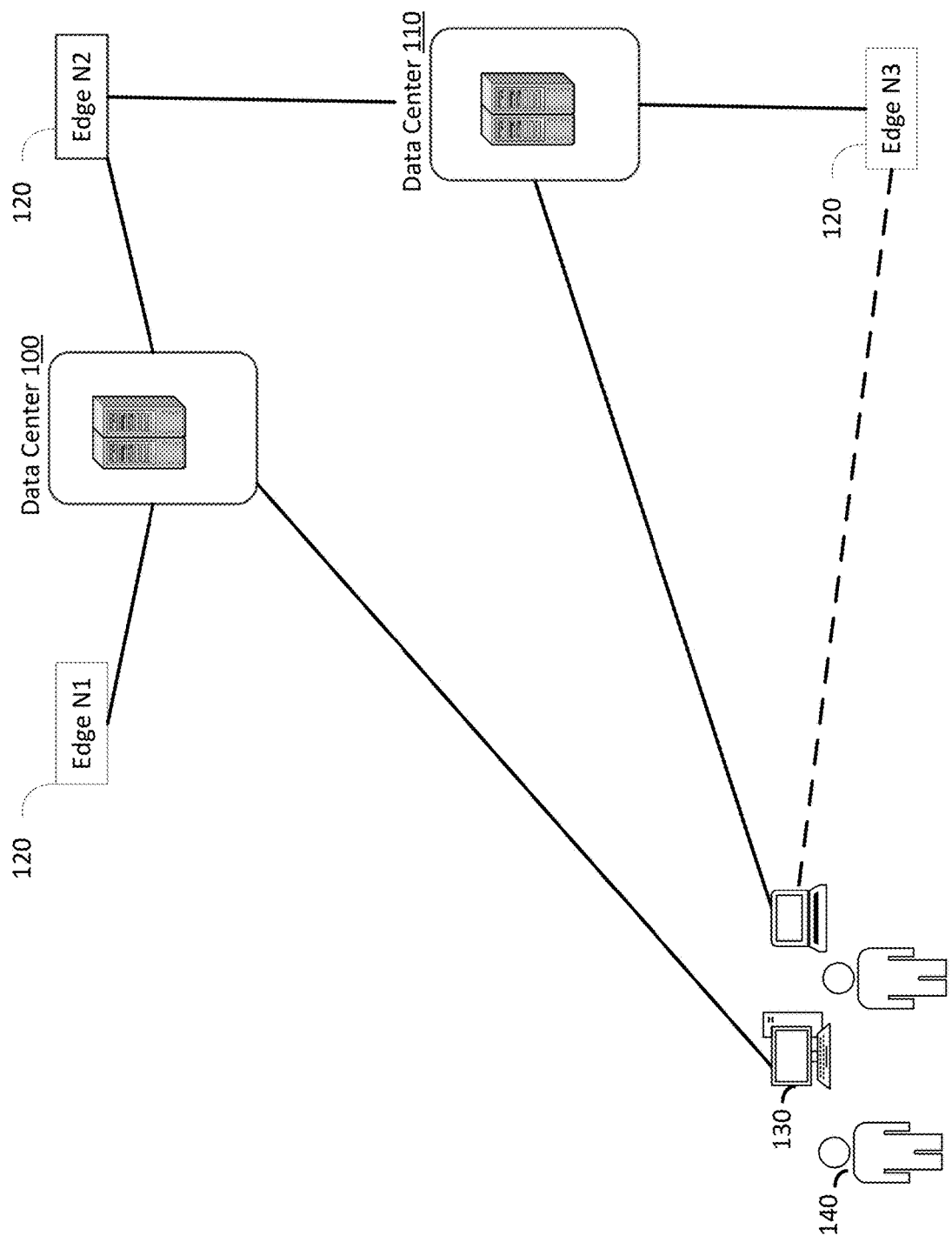
FIG. 1 is a diagram illustrating an example architecture in accordance with the present disclosure.

In some computing environments that provide virtualized computing and storage services, various computing and network services may be configured to enable the service provider to deploy their footprints closer to the user's premises, thereby extending the reach of the computing and network services closer to the user premises. For example, an enterprise that provides network carrier services may want computing services located closer to their networks or their customers, or a manufacturer may want to deploy computing resources closer to their facilities. Users of virtualized computing resources may benefit in many ways by deploying resources such as virtual machines on resources that are located closer to their premises. Additionally, localization of computing and storage devices may enable some users to more effectively meet data residency, compliance, latency, and other requirements, while continuing to benefit from many of the advantages of utilizing remote and/or virtualized computing services, such as scalability and flexibility. Secure and efficient management of the end-to-end capability services by the service provider can enable an experience that is secure, seamless, and consistent when using edge sites.

Various embodiments disclosed herein describe techniques for a cloud service provider that manages remotely located edge sites to enforce network access control by only enabling network ports at the remote edge sites that have authorized devices connected to them. Network devices such as Top of Rack (Tor) switches at the edge sites typically execute network operating systems. One example of a network operating system is SONiC.

In an embodiment, a network device may be configured to establish or implement a root of trust to provide a secure foundation from which further security and trust can be built. The root of trust can be implemented in hardware, firmware, and/or software components. In one embodiment, the root of trust can be implemented through the use of platform integrity techniques such as trusted platform module (TMP)-based secure boot on the network device. Such as network device may be referred to herein as a trusted network device.

In some embodiments, the trusted network device may execute containers that enforce access control at each port of the trusted network device. Once the root of trust is established, the trusted network device may further establish a distributed chain of trust between the remote edge site and the service provider data center. In an embodiment, a chain of trust may be established to authenticate additional devices in the remote edge site. For example, servers at the remote edge site may be issued certificates that chain back to the trusted root at the trusted network device.

In an embodiment, the trusted network device may disable (and by extension disable network access) ports that are connected to unauthorized devices. For example, the trusted network device may be configured to detect unauthorized access to a port on the trusted network device such as when the unauthorized device accesses a port on the trusted network device. The trusted network device may disable the port or discard all communications received from the port after the unauthorized physical access has been detected. In some embodiments, communications from a trusted network device that has been subject to unauthorized access can be blocked entirely. The trusted network device may also be configured to cause the recording of all communications after an unauthorized physical access has been detected.

By providing the trusted network device with the ability to isolate each port, a more granular level of security control may be enabled as compared to relying upon a centralized authentication scheme at the main data center. The disclosed techniques also provide a more scalable way to maintain authentication schemes as the number of edge sites grow, by extending the root of trust to the trusted network devices who can validate compute nodes on their ports via the chain of trust.

In some embodiments, the network operating system of the trusted network device may include a component configured to authenticate or verify the authenticity of any new device that it detects. For example, when the trusted network device identifies a new device, its identity, such as its MAC or other ID, may be checked against a list of authorized devices.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples. While many examples are described using servers and disks, it should be understood that other types of compute nodes and storage devices may be used in other embodiments.

FIG. 1 illustrates one example where users of a data center in accordance with some embodiments. FIG. 1 illustrates data center 100 and 110 that are configured to provide computing resources to users 140 via user computers 130. The computing resources provided by data centers 100 and 110 may be cached or replicated at edge nodes 120. The computing resources provided by the data centers 100 and 110 and edge nodes 120 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

It should be appreciated that although the embodiments disclosed above are discussed in the context of virtual machines, other types of implementations can be utilized with the concepts and technologies disclosed herein. It should be also appreciated that the network topology illustrated in FIG. 1 has been greatly simplified and that many more networks and networking devices may be utilized to interconnect the various computing systems disclosed herein. These network topologies and devices should be apparent to those skilled in the art.

Figure 2A:
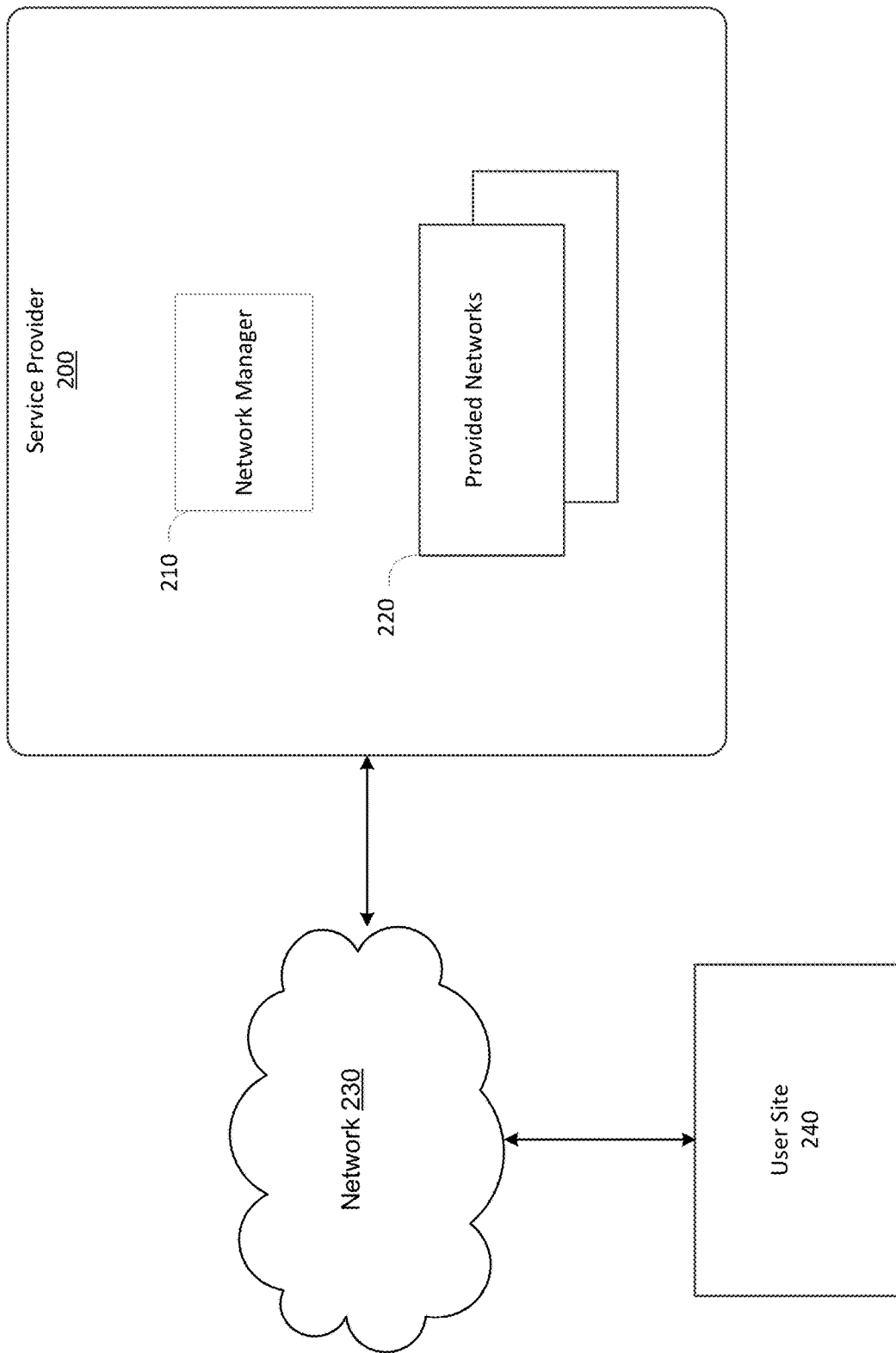
FIG. 2A is a diagram illustrating an example architecture in accordance with the present disclosure.

FIG. 2A illustrates an example computing environment in which the embodiments described herein may be implemented. FIG. 2A illustrates a service provider 200 that is configured to provide computing resources to users at user site 240. The user site 240 may have user computers that may access services provided by service provider 200 via a network 230. The computing resources provided by the service provider 200 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 200 may have various computing resources including servers, routers, and other devices that may provide remotely accessible computing and network resources using, for example, virtual machines. Other resources that may be provided include data storage resources. Service provider 200 may also execute functions that manage and control allocation of network resources, such as a network manager 220.

Network 230 may, for example, be a publicly accessible network of linked networks and may be operated by various entities, such as the Internet. In other embodiments, network 230 may be a private network, such as a dedicated network that is wholly or partially inaccessible to the public. Network 230 may provide access to computers and other devices at the user site 240.

Figure 2B:
FIG. 2B is a diagram illustrating an example architecture in accordance with the present disclosure.

FIG. 2B illustrates an example computing environment in which the embodiments described herein may be implemented. FIG. 2B illustrates that an edge site 250 may be implemented to extend the physical reach of service provider 200 to provide localized computing resources to users at user site 240 using provided networks 260. The computing resources provided by the edge site 250 may include some or all of the various types of resources provided by service provider 200. The resources at edge site 250 may be under the control of service provider 200.

Figure 3:
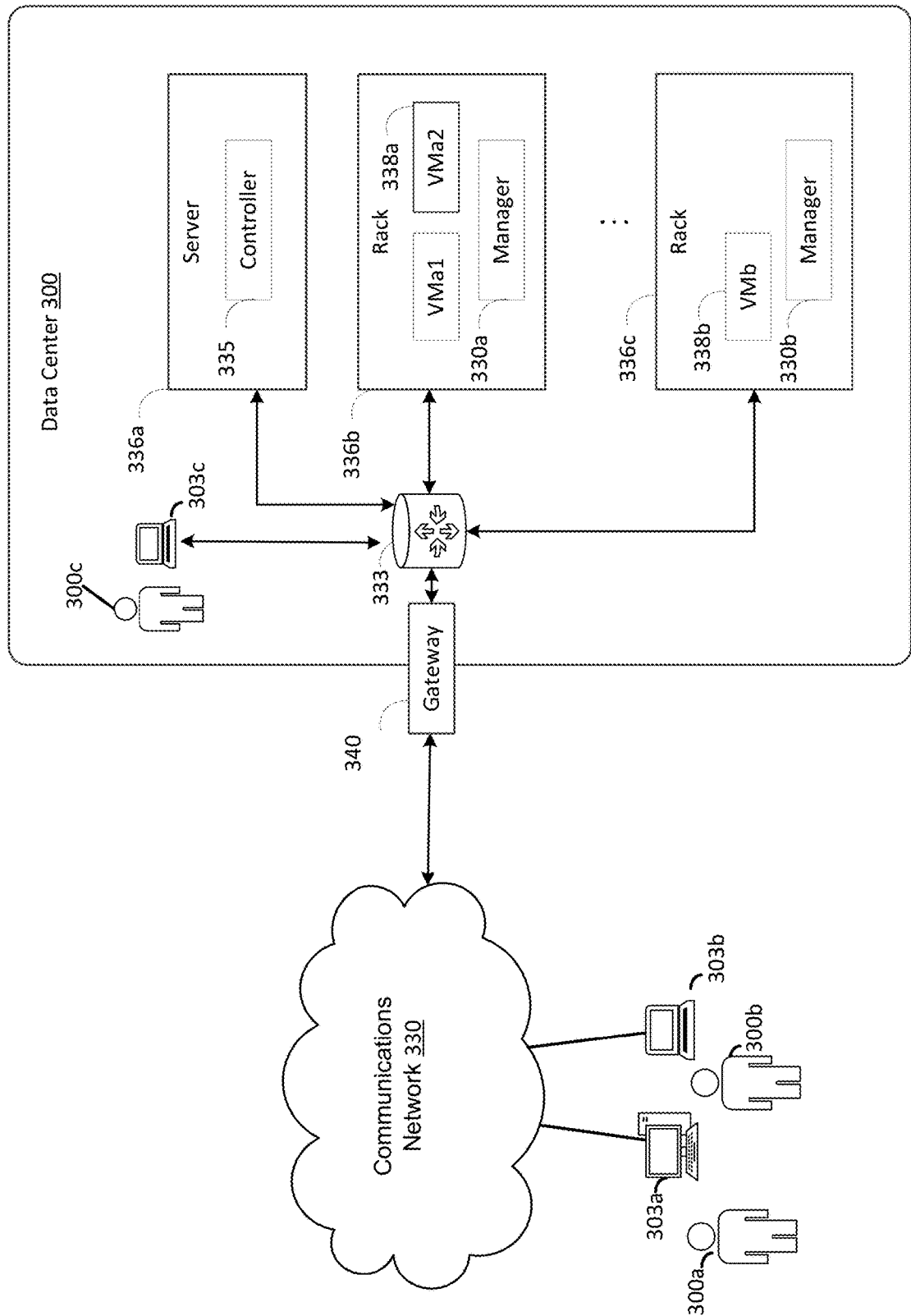
FIG. 3 is a diagram illustrating a data center in accordance with the present disclosure.

FIG. 3 illustrates an example computing environment in which the embodiments described herein may be implemented. FIG. 3 illustrates a data center 300 that is configured to provide computing resources to users 300a, 300b, or 300c (which may be referred herein singularly as "a user 300" or in the plural as "the users 300") via user computers 303a, 303b, and 303c (which may be referred herein singularly as "a computer 303" or in the plural as "the computers 303") via a communications network 330. The computing resources provided by the data center 300 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 300 may correspond to data center 100 and 110 of FIG. 1 or service provider 200 in FIGS. 2A and 2B. Data center 300 may include servers 336a, 336b, and 336c (which may be referred to herein singularly as "a server 336" or in the plural as "the servers 336") that may be standalone or installed in server racks, and provide computing resources available as virtual machines 338a and 338b (which may be referred to herein singularly as "a virtual machine 338" or in the plural as "the virtual machines 338"). The virtual machines 338 may be configured to execute applications such as Web servers, application servers, media servers, database servers, and the like. Other resources that may be provided include data storage resources (not shown on FIG. 3) and may include file storage devices, block storage devices, and the like. Servers 336 may also execute functions that manage and control allocation of resources in the data center, such as a controller 335. Controller 335 may be a fabric controller or another type of program configured to manage the allocation of virtual machines on servers 336.

Referring to FIG. 3, communications network 330 may, for example, be a publicly accessible network of linked networks and may be operated by various entities, such as the Internet. In other embodiments, communications network 330 may be a private network, such as a corporate network that is wholly or partially inaccessible to the public.

Communications network 330 may provide access to computers 303. Computers 303 may be computers utilized by users 300. Computer 303a, 303b or 303c may be a server, a desktop or laptop personal computer, a tablet computer, a smartphone, a set-top box, or any other computing device capable of accessing data center 300. User computer 303a or 303b may connect directly to the Internet (e.g., via a cable modem). User computer 303c may be internal to the data center 300 and may connect directly to the resources in the data center 300 via internal networks. Although only three user computers 303a, 303b, and 303c are depicted, it should be appreciated that there may be multiple user computers.

Computers 303 may also be utilized to configure aspects of the computing resources provided by data center 300. For example, data center 300 may provide a Web interface through which aspects of its operation may be configured through the use of a Web browser application program executing on user computer 303. Alternatively, a stand-alone application program executing on user computer 303 may be used to access an application programming interface (API) exposed by data center 300 for performing the configuration operations.

Servers 336 may be configured to provide the computing resources described above. One or more of the servers 336 may be configured to execute a manager 330a or 330b (which may be referred herein singularly as "a manager 330" or in the plural as "the managers 330") configured to execute the virtual machines. The managers 330 may be a virtual machine monitor (VMM), fabric controller, or another type of program configured to enable the execution of virtual machines 338 on servers 336, for example.

It should be appreciated that although the embodiments disclosed above are discussed in the context of virtual machines, other types of implementations can be utilized with the concepts and technologies disclosed herein.

In the example data center 300 shown in FIG. 3, a network device 333 may be utilized to interconnect the servers 336a and 336b. Network device 333 may comprise one or more switches, routers, or other network devices. Network device 333 may also be connected to gateway 340, which is connected to communications network 330. Network device 333 may facilitate communications within networks in data center 300, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that data center 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 4:
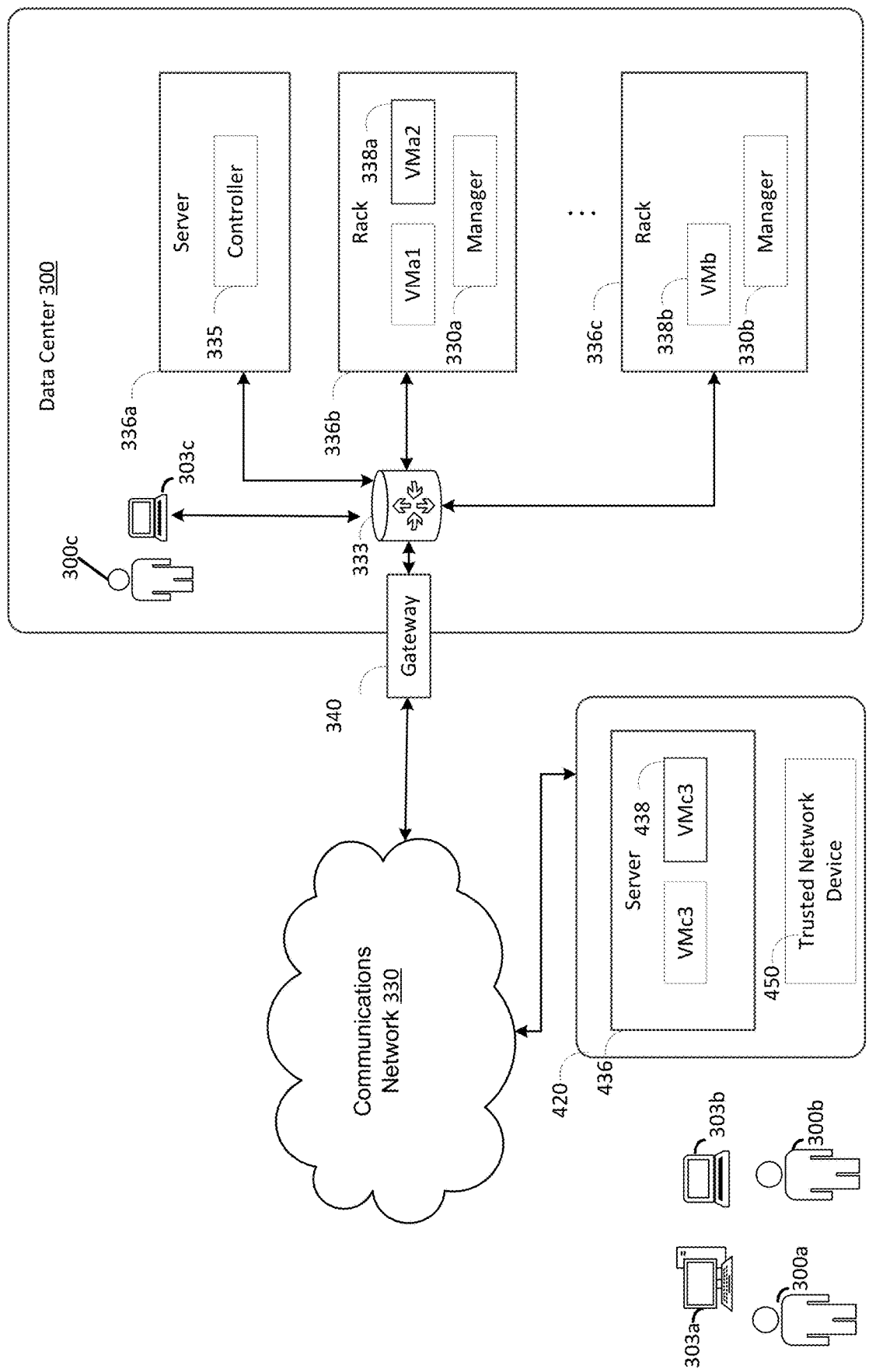
FIG. 4 is a diagram illustrating a data center and local resources in accordance with the present disclosure.

FIG. 4 illustrates an example computing environment illustrating security of computing resources that include an edge site 420 that is geographically proximate to a facility local to users 300, in accordance with the present disclosure. In one embodiment, one or more servers 436 may be installed at the edge site 420. In an embodiment, servers 436 instantiate and run virtual machines 438. Trusted network device 450 may correspond to the trusted network devices as described herein.

In some embodiments, users 300 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Trusted network devices such as trusted Top of Rack (Tor) switches at the edge sites may execute network operating systems that are configured to establish a root of trust and execute containers that enforce access control at each port. A root of trust may be created in the network operating systems through the use of platform integrity techniques such as TPM-based secure boot. Once the root of trust is established, the trusted network devices may establish a distributed chain of trust between the remote edge site and the service provider data center. A chain of trust may be established to authenticate additional devices in the remote edge site, such as servers at the remote edge site that are issued certificates that chain back to the trusted root. The trusted network devices may disable (and by extension network access) ports that are connected to unauthorized devices.

Figure 5:
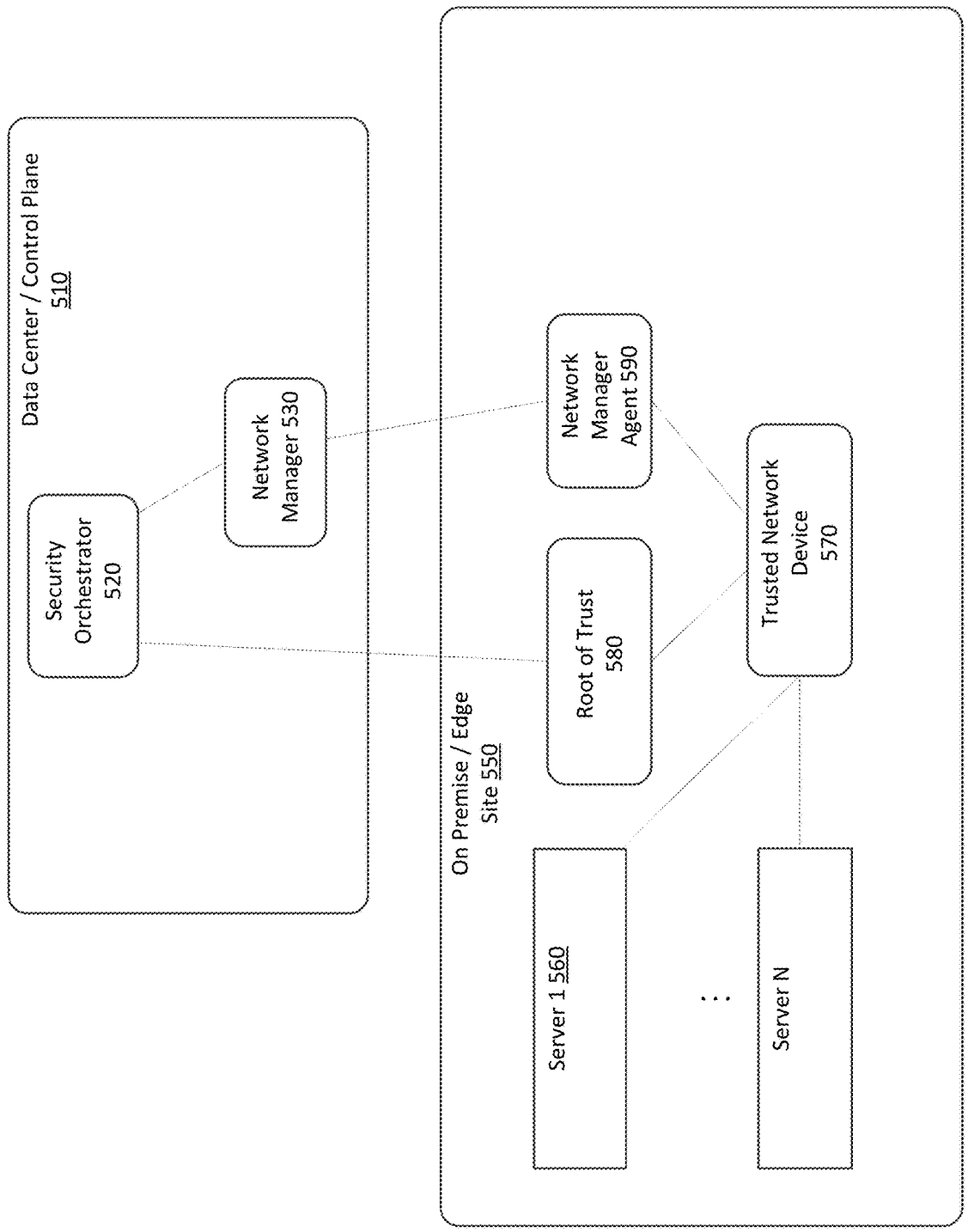
FIG. 5 is a diagram illustrating an architecture for implementing resource management in accordance with the present disclosure.

With reference to FIG. 5, illustrated is one example architecture for providing secure access at edge sites in accordance with the present disclosure. In an embodiment, the architecture may include an edge site 550 that may include one or more servers 560 and trusted network device 570. The trusted network device 570 may include a component that provides root of trust 580.

Network manager agent 590 may be executed as a service running on the trusted network device 570. Network manager agent 590 may be configured to receive requests for operations from network manager 530 at the data center 510. The network manager agent 590 may perform the requested operations at the edge site 550. In an embodiment, in response to receiving a request from network manager 530, the network manager agent 590 may configure its ports to exclude ports that have unauthorized devices attached thereto. When the unauthorized devices are removed, the network manager agent 590 may reconfigured its ports to include the ports that had the attached unauthorized devices.

The security orchestrator 520 may be located in the data center/control plane 510. The security orchestrator 520 may be configured to receive security information for devices at an edge site. The security data may be used to determine whether a newly authorized device should access resources at the data center 510. Network manager 530 may be a control plane component that is configured to communicate with network manager agent 590 at edge site 550. When the security orchestrator 520 determined that a device attached to trusted network device 570 should be exclude, the security orchestrator 520 may communicate this information to the network manager 530. The trusted network device 570 may configure its ports to adhere to instructions received from security orchestrator 520 via network manager agent 590.

Figure 6:
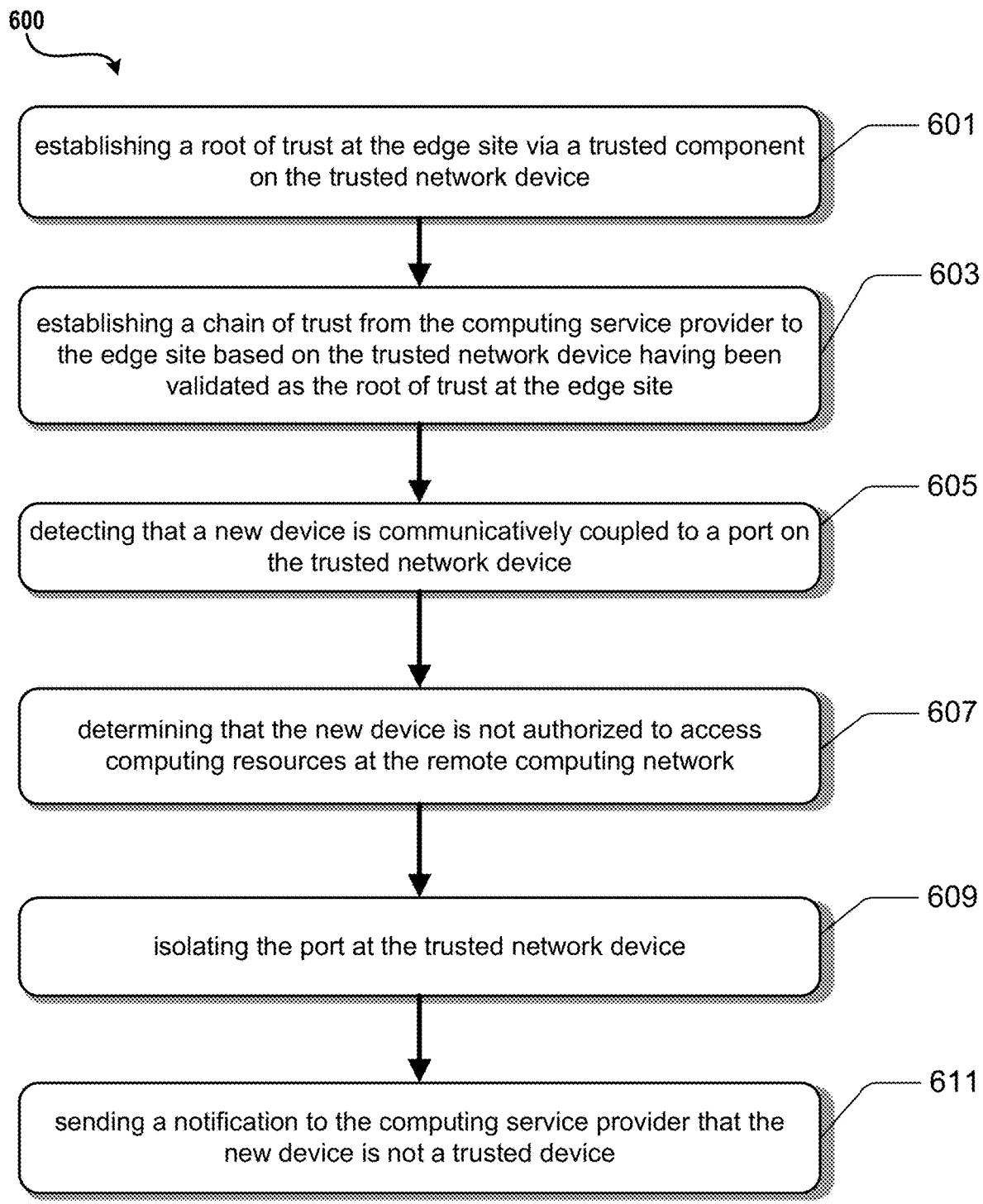
FIG. 6 is a flow diagram for implementing resource management in accordance with the present disclosure.

Turning now to FIG. 6, illustrated is an example operational procedure for securely managing computing resources in a computing environment in accordance with the present disclosure. In an embodiment, the computing environment comprises a computing service provider and an edge site. The edge site comprises computing and network devices configured to enable the computing service provider to extend cloud services to remote users of the computing service provider via local deployment. The network devices include at least a trusted network device that includes a root of trust.

Referring to FIG. 6, operation 601 illustrates establishing, by the trusted network device, a root of trust at the edge site via a trusted component on the trusted network device.

Operation 601 may be followed by operation 603. Operation 603 illustrates establishing a chain of trust from the computing service provider to the edge site based on the trusted network device having been validated as the root of trust at the edge site. In an embodiment, the trusted network device is delegated as a local authority at the edge site by the computing service provider.

Operation 603 may be followed by operation 605. Operation 605 illustrates detecting, by the trusted network device, that a new device is communicatively coupled to a port on the trusted network device.

Operation 605 may be followed by operation 607. Operation 607 illustrates determining, by the trusted network device, that the new device is not authorized to access computing resources at the remote computing network.

Operation 607 may be followed by operation 609. Operation 609 illustrates isolating the port at the trusted network device.

Operation 609 may be followed by operation 611. Operation 611 illustrates in sending a notification to the computing service provider that the new device is not a trusted device.

In an embodiment, the trusted network device executes a network operating system that includes a component operable to authenticate devices attached to ports on the trusted network device.

In an embodiment, the root of trust is a trusted platform module (TPM).

In an embodiment, the trusted network device executes a container configured to enforce access control at a port of the trusted network device.

In an embodiment, the trusted network device is configured to validate certificates issued to newly added devices at the remote computing network.

In an embodiment, isolating the port at the trusted network device comprises disabling the port.

In an embodiment, isolating the port at the trusted network device comprises blocking communications from the new device.

In an embodiment, the network operating system is SONiC.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 7:
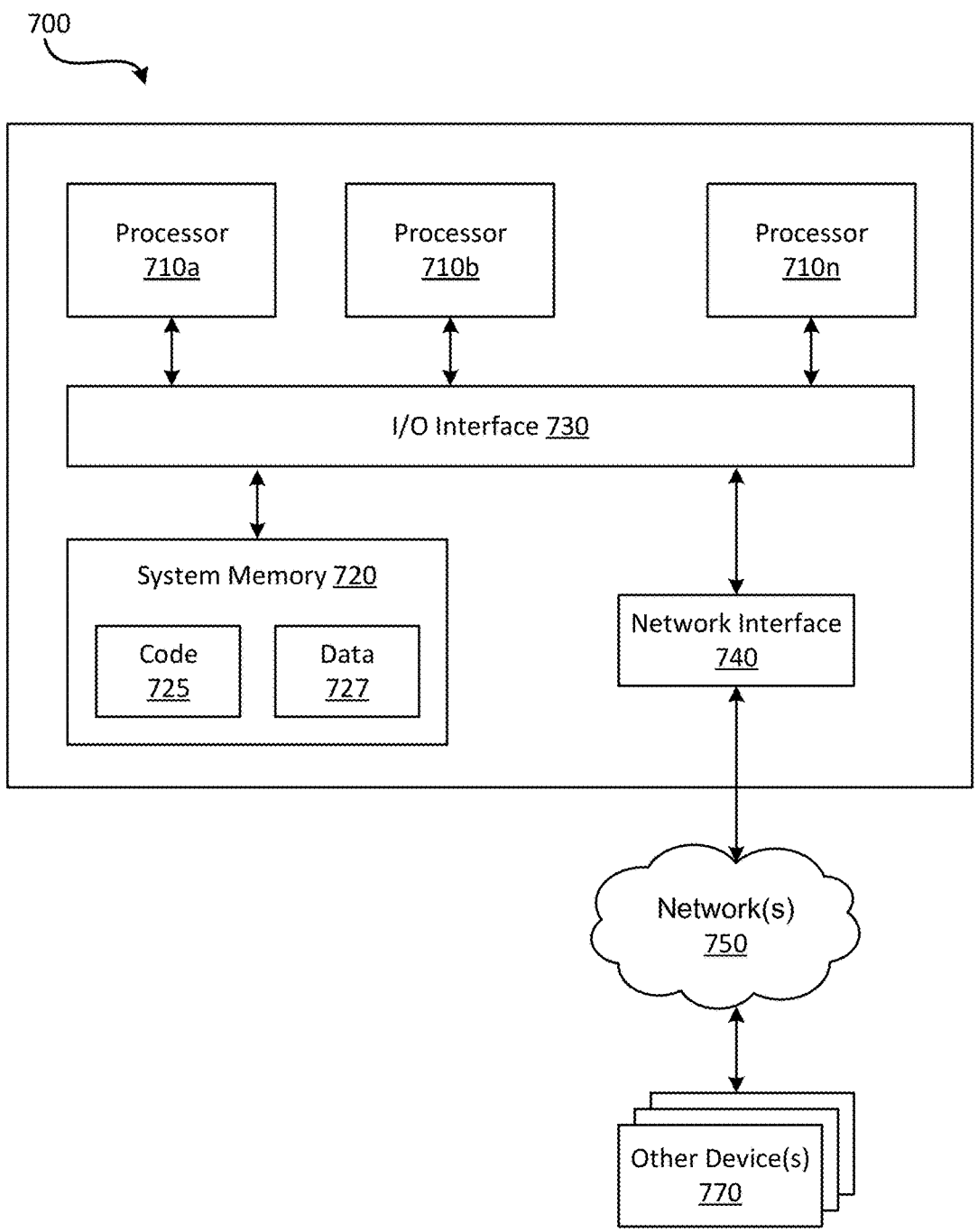
FIG. 7 is an example computing system in accordance with the present disclosure.

FIG. 7 illustrates a general-purpose computing device 700. In the illustrated embodiment, computing device 700 includes one or more processors 710a, 710b, and/or 710n (which may be referred herein singularly as "a processor 710" or in the plural as "the processors 710") coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x77, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 720 as code 725 and data 727.

In one embodiment, I/O interface 730 may be configured to coordinate I/O traffic between the processor 710, system memory 720, and any peripheral devices in the device, including network interface 740 or other peripheral interfaces. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. Also, in some embodiments some or all of the functionality of I/O interface 730, such as an interface to system memory 720, may be incorporated directly into processor 710.

Network interface 740 may be configured to allow data to be exchanged between computing device 700 and other device or devices 770 attached to a network or network(s) 750, such as other computer systems or devices as illustrated in FIGS. 1 through 5, for example. In various embodiments, network interface 740 may support communication via any suitable wired or wireless general data networks, such as types of Ethernet networks, for example. Additionally, network interface 740 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals such as electrical, electromagnetic or digital signals, conveyed via a communication medium such as a network and/or a wireless link, such as may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 7, may include other components that are not explicitly shown in FIG. 7, or may utilize an architecture completely different than that shown in FIG. 7.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for securely managing computing resources in a computing environment comprising a computing service provider and an edge site, the edge site comprising computing and network devices configured to enable the computing service provider to extend cloud services to remote users of the computing service provider via local deployment, the network devices including at least a trusted network routing device executing a network operating system that includes a root of trust at the edge site, the method comprising:
    establishing, by the trusted network routing device, the root of trust at the edge site via a trusted component on the trusted network routing device;
    establishing a chain of trust from the computing service provider to the edge site based on the trusted network routing device having established the root of trust at the edge site, wherein the trusted network routing device is delegated as a local authority at the edge site by the computing service provider;
    detecting, by the trusted network routing device, that a new device is communicatively coupled to a port on the trusted network routing device;
    determining, by the trusted network routing device, that the new device is not authorized to access the computing resources at the edge site;
    isolating the port at the trusted network routing device;
    discarding communications received from the port coupled to the new device in response to determining that the new device is not authorized to access the computing resources at the edge site; and
    sending a notification to the computing service provider that the new device is not a trusted device.

2. The method of claim 1, wherein the trusted network device executes the network operating system that includes a component operable to authenticate devices attached to ports on the trusted network device.

3. The method of claim 1, wherein the root of trust is a trusted platform module (TPM).

4. The method of claim 1, wherein the trusted network device executes a container configured to enforce access control at a port of the trusted network device.

5. The method of claim 1, wherein the trusted network device is configured to validate certificates issued to newly added devices at the edge site.

6. The method of claim 1, wherein isolating the port at the trusted network device comprises disabling the port.

7. The method of claim 1, wherein isolating the port at the trusted network device comprises blocking communications from the new device.

8. The method of claim 2, wherein the network operating system is SONiC.

9. A trusted network routing device of an edge site, the trusted network routing device comprising a network operating system and having established a root of trust at the edge site, the trusted network routing device communicatively coupled to a remote computing network configured to extend computing resources of a computing service provider to remote users of the computing service provider via local deployment, the trusted network routing device comprising:
    one or more processors;
    a trusted component; and
    a memory in communication with the one or more processors, the memory having computer-readable instructions stored thereupon that, when executed by the one or more processors, cause the trusted network routing device to perform operations comprising:
    establishing the root of trust at the edge site via the trusted component on the trusted network routing device;
    establishing a chain of trust from the trusted network routing device to the computing service provider based on the established a root of trust at the edge site via the trusted component, wherein the trusted network routing device is delegated as a local authority at the edge site by the computing service provider;
    detecting that a new device is communicatively coupled to a port on the trusted network routing device;
    determining that the new device is not authorized to access the computing resources at the remote computing network;
    isolating the port at the trusted network routing device;
    discarding communications received from the port coupled to the new device in response to determining that the new device is not authorized to access the computing resources at the remote computing network; and
    sending, to the computing service provider, a notification that the new device is not a trusted device.

10. The trusted network routing device of claim 9, wherein the trusted network routing device executes the network operating system that includes a component operable to authenticate devices attached to ports on the trusted network routing device.

11. The trusted network routing device of claim 10, wherein the root of trust is a trusted platform module (TPM).

12. The trusted network routing device of claim 9, wherein the trusted network routing device executes a container configured to enforce access control at a port of the trusted network routing device.

13. The trusted network routing device of claim 9, wherein the trusted network routing device is configured to validate certificates issued to newly added devices at the remote computing network.

14. The trusted network routing device of claim 9, wherein isolating the port at the trusted network routing device comprises disabling the port.

15. The trusted network routing device of claim 9, wherein isolating the port at the trusted network routing device comprises blocking communications from the new device.

16. The trusted network routing device of claim 10, wherein the network operating system is SONiC.

17. A non-transitory computer-readable storage medium having a network operating system and computer-executable instructions stored thereupon which, when executed by one or more processors of a trusted network routing device of an edge site at a remote computing network having a root of trust and configured to extend computing resources of a computing service provider to remote users of the computing service provider via local deployment, cause the trusted network routing device to:
    establish the root of trust at the edge site via a trusted component on the trusted network routing device;
    based on the root of trust established at the edge site, establishing a chain of trust from the remote computing network to the computing service provider, wherein the trusted network routing device is delegated as a local authority at the edge site by the computing service provider;
    detect that a new device is communicatively coupled to a port on the trusted network routing device;
    determine that the new device is not authorized to access the computing resources at the remote computing network;
    isolate the port at the trusted network routing device;
    discard communications received from the port coupled to the new device in response to determining that the new device is not authorized to access the computing resources at the remote computing network; and
    send a notification to the computing service provider that the new device is not a trusted device.

18. The non-transitory computer-readable storage medium of claim 17, wherein the root of trust is a trusted platform module (TPM).

19. The non-transitory computer-readable storage medium of claim 17, wherein isolating the port at the trusted network routing device comprises disabling the port.

20. The non-transitory computer-readable storage medium of claim 17, further comprising computer-executable instructions stored thereupon which, when executed by the one or more processors of the trusted network routing device, cause the trusted network routing device to:
    validate certificates issued to newly added devices at the remote computing network.

* * * * *